(12) United States Patent
Tang

(10) Patent No.: US 7,269,327 B2
(45) Date of Patent: Sep. 11, 2007

(54) BRIGHTNESS ENHANCEMENT FILM HAVING A REINFORCING STRUCTURE

(75) Inventor: Shih-Chieh Tang, Tainan (TW)

(73) Assignee: Efun Technology Co., Ltd, Tainan (TW)

( * ) Notice: Subject to any disclaimer, the term of this patent is extended or adjusted under 35 U.S.C. 154(b) by 129 days.

(21) Appl. No.: 11/160,992

(22) Filed: Jul. 19, 2005

(65) Prior Publication Data

US 2007/0002471 A1    Jan. 4, 2007

(30) Foreign Application Priority Data

Jun. 30, 2005  (TW) ............... 94122042 A

(51) Int. Cl.
  G02B 6/10   (2006.01)
  G02B 6/34   (2006.01)
  G02F 1/1335 (2006.01)
(52) U.S. Cl. ............ 385/146; 385/36; 385/37; 385/901; 349/64; 349/65
(58) Field of Classification Search ......... 385/901, 385/31, 36, 37, 146, 147; 359/575, 619; 362/27, 31; 349/64, 65
See application file for complete search history.

(56) References Cited

U.S. PATENT DOCUMENTS

| | | | |
|---|---|---|---|
| 5,245,454 A * | 9/1993 | Blonder | 349/113 |
| 5,300,263 A | 4/1994 | Hoopman et al. | 264/2.5 |
| 5,626,800 A | 5/1997 | Williams et al. | 264/1.38 |
| 5,919,551 A | 7/1999 | Cobb, Jr. et al. | 428/156 |
| 6,277,471 B1 * | 8/2001 | Tang | 428/172 |
| 6,280,063 B1 | 8/2001 | Fong et al. | 362/333 |
| 6,581,286 B2 * | 6/2003 | Campbell et al. | 29/895.31 |
| 6,759,113 B1 * | 7/2004 | Tang | 428/156 |
| 6,845,212 B2 * | 1/2005 | Gardiner et al. | 385/146 |
| 6,862,141 B2 * | 3/2005 | Olczak | 359/621 |
| 6,951,400 B2 * | 10/2005 | Chisholm et al. | 362/29 |
| 6,981,792 B2 * | 1/2006 | Nagakubo et al. | 362/600 |
| 7,090,389 B2 * | 8/2006 | Parker et al. | 362/627 |
| 2005/0007513 A1 * | 1/2005 | Lee et al. | 349/57 |
| 2005/0237641 A1 * | 10/2005 | Tang | 359/831 |
| 2007/0002471 A1 * | 1/2007 | Tang | 359/831 |

* cited by examiner

Primary Examiner—Frank G. Font
Assistant Examiner—Charlie Peng
(74) Attorney, Agent, or Firm—Alan Kamrath; Kamrath & Associates PA

(57) ABSTRACT

A brightness enhancement film includes a light-refracting microstructure layer, a substrate and a reinforcing layer. The substrate has a first surface and a second surface opposite thereto. The light-refracting microstructure layer is arranged on the first surface of the substrate and is so configured to vary in curvatures for refracting light. The reinforcing layer is arranged on the second surface of the substrate and is so configured to form a relatively high degree of hardness. Accordingly, the reinforcing layer can prevent warpage and abrasion of the brightness enhancement film.

28 Claims, 5 Drawing Sheets

BRIGHTNESS ENHANCEMENT FILM HAVING A REINFORCING STRUCTURE

BACKGROUND OF THE INVENTION

1. Field of the Invention

The present invention relates to a brightness enhancement film having a reinforcing structure for use in a liquid crystal display. Particularly, the present invention relates to the brightness enhancement film including a light-refracting microstructure layer and a reinforcing layer at either side thereof. More particularly, the present invention relates to the brightness enhancement film having the reinforcing structure which has a degree of hardness greater than that of a substrate.

2. Description of the Related Art

Referring initially to FIG. 1, U.S. Pat. No. 5,626,800, entitled "Prevention of Groove Tip Deformation in Brightness Enhancement Film," discloses a brightness enhancement film 1 including a substrate (i.e. base) 11 and a plurality of prism units 12 provided thereon. The prism units 12 are arranged and juxtaposed on a top surface of the substrate 11 in order. Each of the prism units 12 consists of a first inclined surface 12a and a second inclined surface 12b connected thereto, and serves to refract light penetrated through the substrate 11 in use for enhancing brightness of light.

In manufacture, the substrate 11 of the brightness enhancement film 1 has a bottom surface which is an ordinary flat surface and opposite to the top surface. However, the top surface and the bottom surface disposed on the substrate 11 of the brightness enhancement film 1 are unmatched in structure which may cause a specific degree of warpage of the brightness enhancement film 1 in nature. Furthermore, the brightness enhancement films 1 are piled upon each other on a conveyer (not shown in FIG. 1) if the products are finally made. This practice unavoidably causes warpage and abrasion of the surfaces of the brightness enhancement films 1, and disadvantageously affects quality and quantity of output of the brightness enhancement films 1.

U.S. Pat. No. 6,280,063, entitled "Brightness Enhancement Article," also discloses another brightness enhancement film including a substrate, a prism unit layer and a light-diffusing surface. The prism unit layer and the light-diffusing surface serve as a top surface and a bottom surface of the substrate. This permits light to penetrate from the light-diffusing surface to the prism unit layer where light is emitted. The light-diffusing surface contains several light-diffusing particles which naturally diffuse light. Correspondingly, the prism unit layer is used to refract light penetrating the brightness enhancement film. Even though the brightness enhancement film has the light-diffusing surface at its bottom side, the light-diffusing surface cannot prevent warpage of the brightness enhancement film in nature. Furthermore, the light-diffusing particles of the brightness enhancement film protrude like raised particles on the light-diffusing surface and, thus, scrape the surface of another brightness enhancement film while piling upon each other. Also, this practice unavoidably causes warpage and abrasion of the surfaces of the brightness enhancement films, and disadvantageously affects quality and quantity of output of the brightness enhancement films.

The present invention intends to provide a brightness enhancement film having a reinforcing structure including a light-refracting microstructure layer and a reinforcing layer at either side thereof. The light-refracting microstructure layer is used to vary curvatures of a top surface, and the reinforcing layer is used to provide a specific degree of hardness in such a way to mitigate and overcome the above problem. Accordingly, the reinforcing layer can prevent warpage and abrasion of the brightness enhancement film.

SUMMARY OF THE INVENTION

The primary objective of this invention is to provide a brightness enhancement film having a light-refracting microstructure layer and a reinforcing layer at either surface of a substrate. The reinforcing layer can enhance a specific degree of hardness of the brightness enhancement film. Accordingly, the reinforcing layer can prevent warpage and abrasion of the brightness enhancement film.

The secondary objective of this invention is to provide the brightness enhancement film having the reinforcing layer with, a rate of shrinkage of a transparent material of the reinforcing layer being controlled to perform a specific degree of hardness of the brightness enhancement film.

Another objective of this invention is to provide the brightness enhancement film having the light-refracting microstructure layer with the light-refracting microstructure selected from prism units, micro-hemispheres, micro cones, micro rippled ridges, meandering microstructure or curved prism units. Accordingly, the light-refracting microstructure can improve light refraction of the brightness enhancement film.

The brightness enhancement film in accordance with the present invention includes a light-refracting microstructure layer, a substrate and a reinforcing layer. The substrate has a first surface and a second surface opposite thereto. The light-refracting microstructure layer is arranged on the first surface of the substrate and is so configured to vary in curvatures for refracting light. The reinforcing layer is arranged on the second surface of the substrate and is so configured to form a relatively high degree of hardness. Accordingly, the reinforcing layer can prevent warpage and abrasion of the brightness enhancement film.

Further scope of the applicability of the present invention will become apparent from the detailed description given hereinafter. However, it should be understood that the detailed description and specific examples, while indicating preferred embodiments of the invention, are given by way of illustration only, since various variations will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE INVENTION

Figure 2:
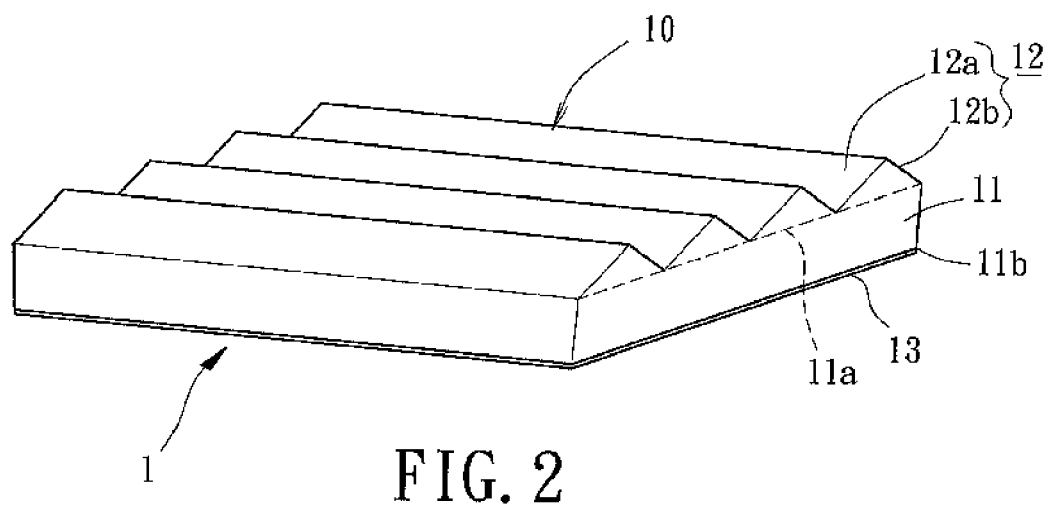
FIG. 2 is a perspective view of a brightness enhancement film having a reinforcing structure in accordance with a first embodiment of the present invention.

Referring initially to FIG. 2, a brightness enhancement film 1 having a reinforcing structure in accordance with a first embodiment of the present invention includes a light-refracting microstructure layer 10, a substrate 11 and a reinforcing layer 13. Generally, the substrate 11 has a first surface 11a and a second surface 11b opposite thereto. The substrate 11 is made from a transparent material to permit light to penetrate from the second surface 11b to the first surface 11a, and it further enhances brightness of light.

Still referring to FIG. 2, the construction of the light-refracting microstructure layer 10 in accordance with the first embodiment of the present invention shall be described in detail. Typically, the light-refracting microstructure layer 10 is deployed on a light emission side of the substrate 11 with respect to a light source (not shown). In the first embodiment, the light-refracting microstructure layer 10 consists of a plurality of prism units 12. The prism units 12 are arranged and juxtaposed on the first surface 11a of the substrate 11 in order. Each of the prism units 12 has a predetermined height raised from the first surface 11a of the substrate 11, and consists of a first flat inclined surface 12a and a second flat inclined surface 12b connected thereto. In use, the first inclined surfaces 12a and the second inclined surfaces 12b serve to refract light penetrated through the substrate 11 in at least one dimension for enhancing brightness of light. In the first embodiment, the light-refracting microstructure layer 10 and the substrate 11 are preferably made from all the same transparent material, such as an epoxy or UV (ultraviolet) curable adhesive having a specific degree of refractive index in nature. The light-refracting microstructure layer 10 is integrally formed on the first surface 11a of the substrate 11. In an alternative embodiment, the light-refracting microstructure layer 10 and the substrate 11 are separately made from different transparent materials and adhered to each other according to the design choice. Accordingly, the various materials and processes involved in the manufacture of the brightness enhancement film 1 can determine its performance and characteristics.

Still referring to FIG. 2, the constructions of the reinforcing layer 13 in accordance with the first embodiment of the present invention shall be described in detail. The reinforcing layer 13 covers the second surface 11b of the substrate 11 to form a composite reinforced laminate by using one of coating, adhesive, physical vapor deposition or sputtering deposition. Preferably, the reinforcing layer 13 is deployed on a light incident side of the substrate 11 with respect to a light source (not shown). The reinforcing layer 13 is made from a transparent material, such as an acrylic resin, having a lower degree of refractive index relative to that of the substrate 11. Preferably, the transparent material of the reinforcing layer 13 has a hardness greater than that of the substrate 11 such that the reinforcing layer 13 can protect the second surface 11b of the substrate 11 from abrasion. In the first embodiment, the transparent material of the reinforcing layer 13 also has a rate of shrinkage substantially similar or approximately to that of the substrate 11. Furthermore, the reinforcing layer 13 is designed to possess a thickness ranging between 5 μm and 10 μm which may be achieved at a relatively reasonable cost in that the minimum of material is used in the intended manner. Advantageously, the quality of the reinforcing layer 13 can be controlled by such a thickness. However, dimensions of the reinforcing layer 13 bear adequate strength to withstand normal usage of the brightness enhancement film 1.

Still referring to FIG. 2, the manufacture of the brightness enhancement film 1 in accordance with the first embodiment of the present invention shall be described in detail. The arrangement of the first inclined surfaces 12a and the second inclined surfaces 12b of the prism units 12 can be varied according to the design need. Such practice may, however, cause spontaneous warpage of the substrate 11. The reinforcing layer 13 can perform a relatively high degree of hardness that may alleviate the possibility of occurring warpage of the brightness enhancement film 1. Consequently, the brightness enhancement film 1 has a high degree of warpage resistance. Furthermore, the hardness of the reinforcing layer 13 can protect the second surface 11b of the substrate 11 against abrasion and scraping. Consequently, the brightness enhancement film 1 can carry out a high degree of abrasion resistance.

Figure 3:
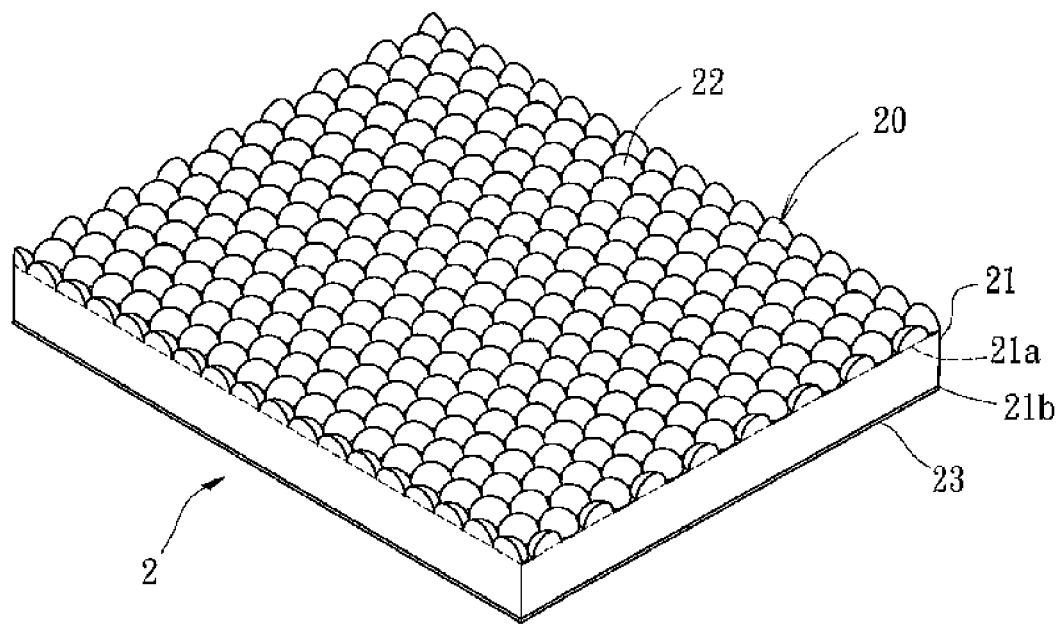
FIG. 3 is a perspective view of the brightness enhancement film having the reinforcing structure in accordance with a second embodiment of the present invention.

Turning now to FIG. 3, the brightness enhancement film 2 having a reinforcing structure in accordance with a second embodiment of the present invention is illustrated. In the second embodiment, the brightness enhancement film 2 includes a light-refracting microstructure layer 20, a substrate 21 and a reinforcing layer 23 which are stacked to constitute the brightness enhancement film 2. Generally, the substrate 21 has a first surface 21a and a second surface 21b opposite thereto. The light-refracting microstructure layer 20 consists of a plurality of micro-hemispheres 22 which are raised on the first surface 21a of the substrate 21 in order to form hexagonal units. Conversely, the reinforcing layer 23 covers the second surface 21b of the substrate 21 to form a composite reinforced laminate. In the second embodiment, the micro-hemispheres 22 of the light-refracting microstructure layer 20 are used to refract light and are arranged to form a plurality of hexagonal units in a hexagonal manner such that each of the micro-hemispheres 22 has six of the adjacent micro-hemispheres 22. In use, the micro-hemispheres 22 serve to circularly refract light penetrated through the substrate 21 in two dimensions for enhancing brightness of light. Additionally, the reinforcing layer 13 can perform a relatively high degree of hardness so that the brightness enhancement film 1 has a high degree of warpage resistance and abrasion resistance.

Figure 4:
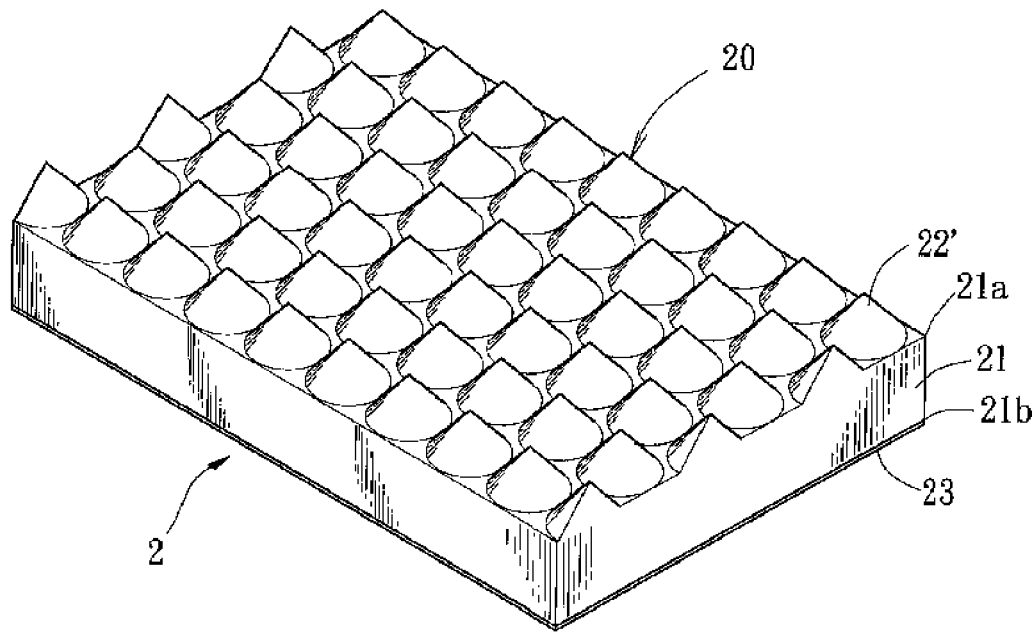
FIG. 4 is a perspective view of the brightness enhancement film having the reinforcing structure in accordance with a third embodiment of the present invention.

Turning now to FIG. 4, the brightness enhancement film 2 having a reinforcing structure in accordance with a third embodiment of the present invention is illustrated. In the third embodiment, the brightness enhancement film 2 includes a light-refracting microstructure layer 20, a substrate 21 and a reinforcing layer 23 which are stacked to constitute the brightness enhancement film 2. Generally, the substrate 21 has a first surface 21a and a second surface 21b opposite thereto. The light-refracting microstructure layer 20 consists of a plurality of micro cones 22' which are raised on the first surface 21a of the substrate 21 in order to form hexagonal units. Conversely, the reinforcing layer 23 covers the second surface 21b of the substrate 21 to form a composite reinforced laminate. In the third embodiment, the micro cones 22' of the light-refracting microstructure layer 20 are used to refract light and are arranged to form a plurality of hexagonal units in a hexagonal manner such that each of the micro cones 22' has six of the adjacent micro cones 22'. In use, the micro cones 22' serve to circularly refract light penetrated through the substrate 21 in two dimensions for enhancing brightness of light. In comparison with the second embodiment, the micro cones 22' of the third embodiment can advantageously alleviate the deficiency of bright light spots generated from the micro-hemispheres 22 of the second embodiment. Additionally, the reinforcing layer 23 can perform a relatively high degree of hardness so that the brightness enhancement film 2 has a high degree of warpage resistance and abrasion resistance.

Figure 5:
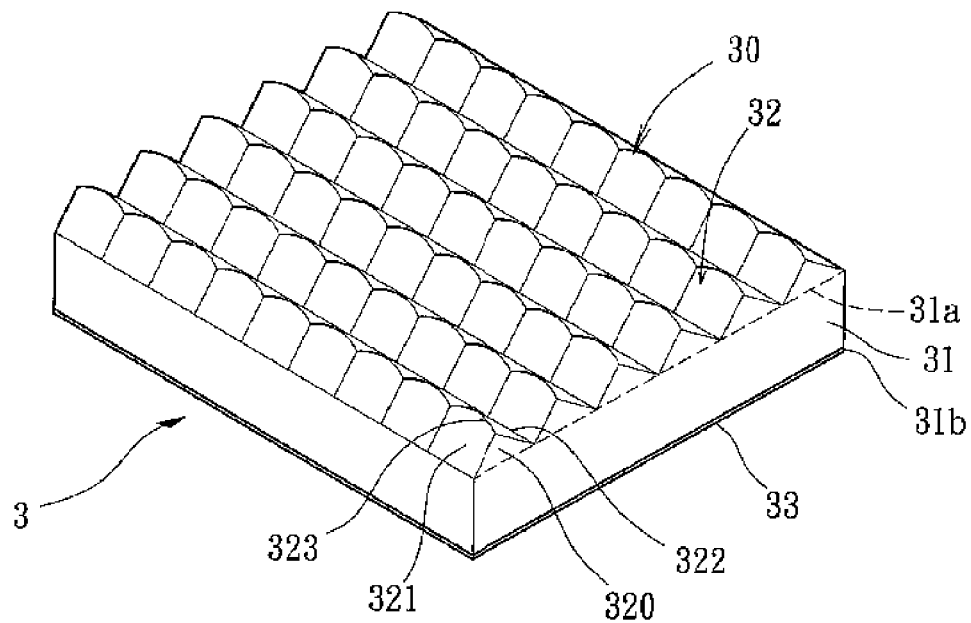
FIG. 5 is a perspective view of the brightness enhancement film having the reinforcing structure in accordance with a fourth embodiment of the present invention.

Turning now to FIG. 5, the brightness enhancement film 3 having a reinforcing structure in accordance with a fourth embodiment of the present invention is illustrated. In the fourth embodiment, the brightness enhancement film 3 includes a light-refracting microstructure layer 30, a substrate 31 and a reinforcing layer 33 which are stacked to constitute the brightness enhancement film 3. Generally, the substrate 31 has a first surface 31a and a second surface 31b opposite thereto. The light-refracting microstructure layer 30 consists of a plurality of micro rippled ridges 32 which are raised and juxtaposed on the first surface 31a of the substrate 31 in order. Each of the micro rippled ridges 32 consists of a plurality of micro light-condensing units 320 substantially having a common height, and each of which has a pair of curved surfaces 321, a pair of common trough lines 322 and a common ridgeline 323. Typically, the curved surface 321 of the micro light-condensing units 320 has an inclination from the common ridgeline 323 to the common trough line 322. Preferably, the common trough line 322 is substantially constructed from a straight line while the common ridgeline 323 is substantially constructed from a curved line. In order to reinforce and protect the brightness enhancement film 3, the reinforcing layer 33 covers the second surface 31b of the substrate 31 to form a composite reinforced laminate. In use, the micro light-condensing units 320 serve to refract light penetrated through the substrate 31 in two dimensions for enhancing brightness of light. Additionally, the reinforcing layer 33 can perform a relatively high degree of hardness so that the brightness enhancement film 3 has a high degree of warpage resistance and abrasion resistance.

Figure 6:
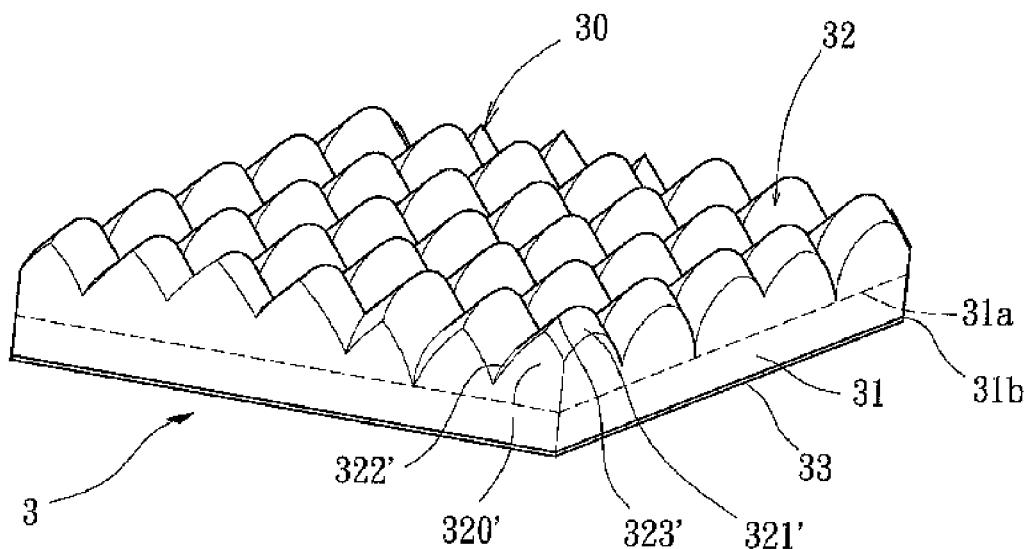
FIG. 6 is a perspective view of the brightness enhancement film having the reinforcing structure in accordance with a fifth embodiment of the present invention.

Turning now to FIG. 6, the brightness enhancement film 3 having a reinforcing structure in accordance with a fifth embodiment of the present invention is illustrated. In the fifth embodiment, the brightness enhancement film 3 includes a light-refracting microstructure layer 30, a substrate 31 and a reinforcing layer 33 which are stacked to constitute the brightness enhancement film 3. Generally, the substrate 31 has a first surface 31a and a second surface 31b opposite thereto. The light-refracting microstructure layer 30 consists of a plurality of micro rippled ridges 32 which are raised and juxtaposed on the first surface 31a of the substrate 31 in order. Each of the micro rippled ridges 32 consists of a plurality of micro light-condensing units 320' substantially having a common height, and each of which has a pair of curved surfaces 321', a pair of trough bottom lines 322' and a peak line 323'. Typically, the curved surface 321' of the micro light-condensing units 320' has a uniform curvature from the peak line 323' to the trough bottom line 322'. In comparison with the fourth embodiment, the trough bottom line 322' of the fifth embodiment is substantially constructed from a curved line which permits a portion of the curved surface 321' adjacent to the trough bottom line 322' to have a uniform curvature. In order to reinforce and protect the brightness enhancement film 3, the reinforcing layer 33 covers the second surface 31b of the substrate 31 to form a composite reinforced laminate. In use, the micro light-condensing units 320' serve to refract light penetrated through the substrate 31 in two dimensions for enhancing brightness of light. Additionally, the reinforcing layer 33 can perform a relatively high degree of hardness so that the brightness enhancement film 3 has a high degree of warpage resistance and abrasion resistance.

Figure 7:
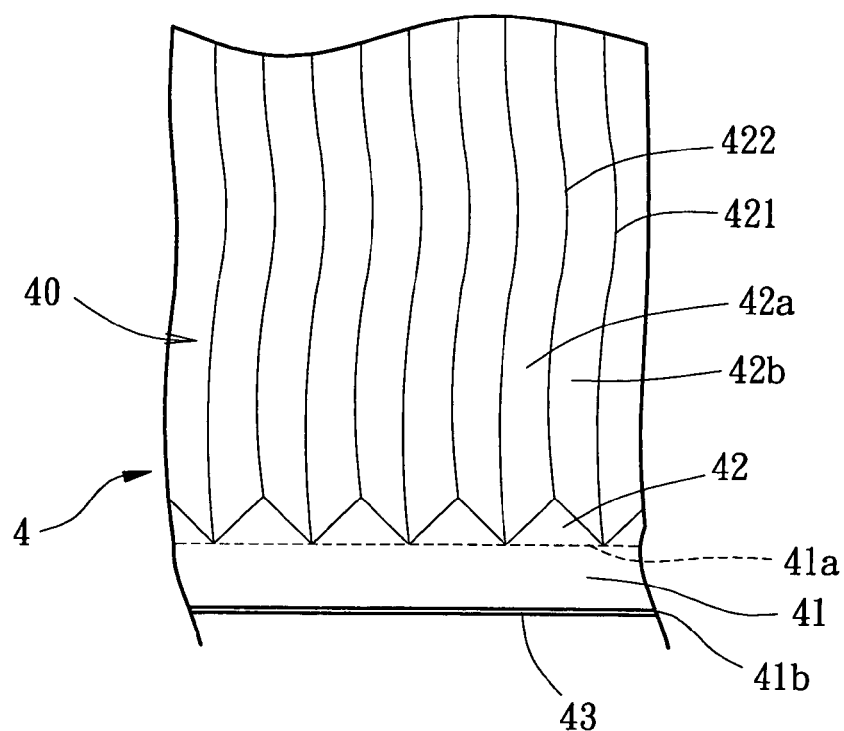
FIG. 7 is a partially enlarged perspective view of the brightness enhancement film having the reinforcing structure in accordance with a sixth embodiment of the present invention.

Turning now to FIG. 7, the brightness enhancement film 4 having a reinforcing structure in accordance with a sixth embodiment of the present invention is illustrated. In the sixth embodiment, the brightness enhancement film 4 includes a light-refracting microstructure layer 40, a substrate 41 and a reinforcing layer 43 which are stacked to constitute the brightness enhancement film 4. Generally, the substrate 41 has a first surface 41a and a second surface 41b opposite thereto. In comparison with the first embodiment, the light-refracting microstructure layer 40 of the sixth embodiment consists of a plurality of curved prism units 42 which are raised on the first surface 41a of the substrate 41 and parallel to each other. Conversely, the reinforcing layer 43 covers the second surface 41b of the substrate 41 to form a composite reinforced laminate. In the sixth embodiment, each of the curved prism units 42 has a pair of meandering surfaces 42a, 42b, a pair of common trough lines 421 and a common ridge 422. Preferably, each of the curved prisms 42 substantially has a common horizontal width and a common vertical height, and each of the meandering surfaces 42a, 42b of the curved prisms 42 substantially has the same changes in curvature. At least one of the meandering surfaces 42a and 42b forms a curved surface having changes in curvature. In use, the meandering surfaces 42a, 42b serve to refract light penetrated through the substrate 41 in two dimensions for enhancing brightness of light and attenuating morie phenomenon. Additionally, the reinforcing layer 43 can perform a relatively high degree of hardness so that the brightness enhancement film 4 has a high degree of warpage resistance and abrasion resistance.

Figure 8:
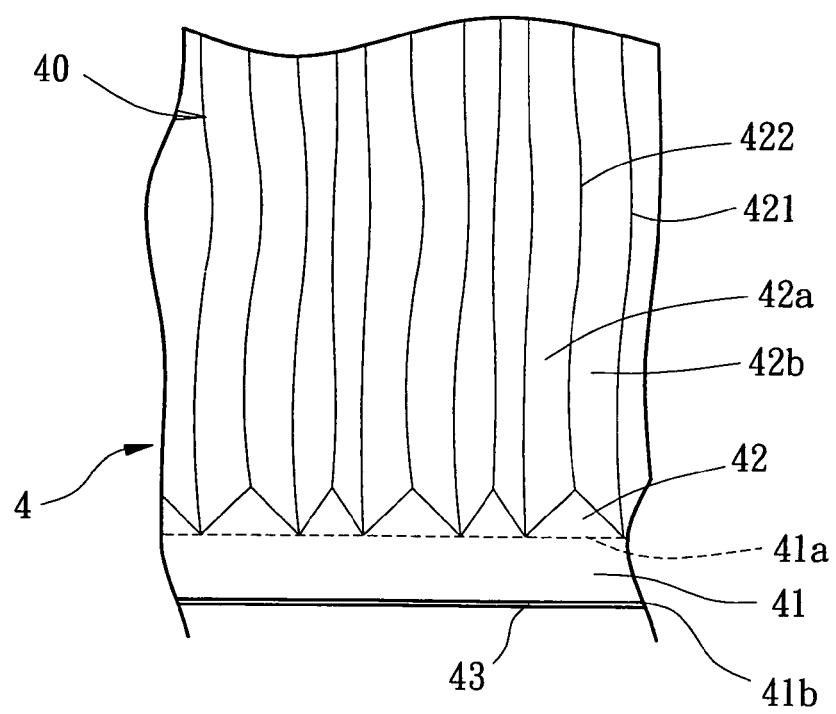
FIG. 8 is a partially enlarged perspective view of the brightness enhancement film having the reinforcing structure in accordance with a seventh embodiment of the present invention.

Turning now to FIG. 8, the brightness enhancement film 4 having a reinforcing structure in accordance with a seventh embodiment of the present invention is illustrated. In the seventh embodiment, the brightness enhancement film 4 includes a light-refracting microstructure layer 40, a substrate 41 and a reinforcing layer 43 which are stacked to constitute the brightness enhancement film 4. Generally, the substrate 41 has a first surface 41a and a second surface 41b opposite thereto. The light-refracting microstructure layer 40 consists of a plurality of curved prism units 42 which are raised on the first surface 41a of the substrate 41 and parallel to each other. Conversely, the reinforcing layer 43 covers the second surface 41b of the substrate 41 to form a composite reinforced laminate. Each of the curved prism units 42 has a pair of meandering surfaces 42a, 42b, a pair of common trough lines 421 and a common ridge 422. In comparison with the sixth embodiment, each of the curved prisms 42 of the seventh embodiment substantially has a common vertical height but varies in horizontal widths such that each of the meandering surfaces 42a, 42b of the curved prisms 42 varies in curvature. At least one of the meandering surfaces 42a and 42b forms a curved surface having changes in curvature. In use, the meandering surfaces 42a, 42b serve to refract light penetrated through the substrate 41 in two dimensions for enhancing brightness of light and attenuating morie phenomenon. Additionally, the reinforcing layer 43 can perform a relatively high degree of hardness so that the brightness enhancement film 4 has a high degree of warpage resistance and abrasion resistance.

Figure 9:
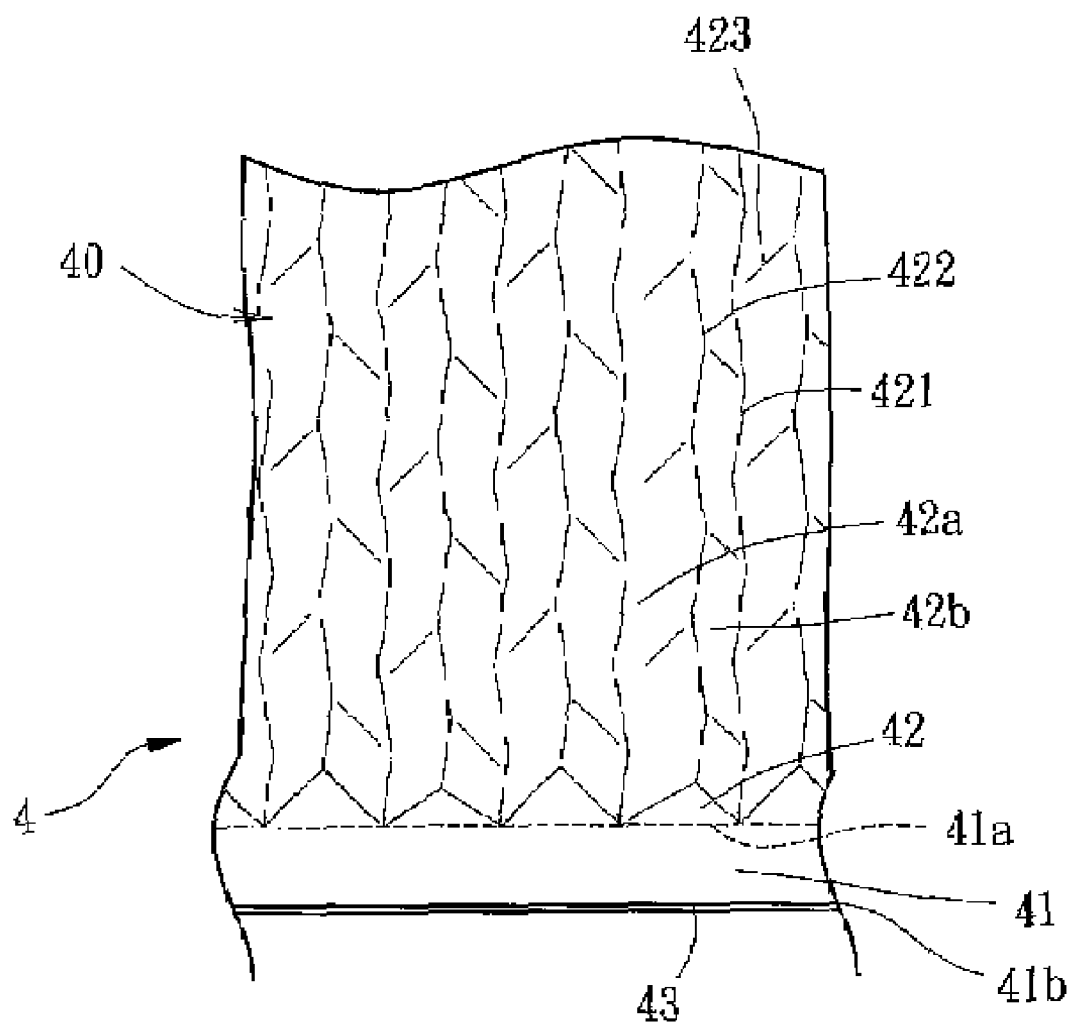
FIG. 9 is a partially enlarged perspective view of the brightness enhancement film having the reinforcing structure in accordance with an eighth embodiment of the present invention.

Turning now to FIG. 9, the brightness enhancement film 4 having a reinforcing structure in accordance with an eighth embodiment of the present invention is illustrated. In the eighth embodiment, the brightness enhancement film 4 includes a light-refracting microstructure layer 40, a substrate 41 and a reinforcing layer 43 which are stacked to constitute the brightness enhancement film 4. Generally, the substrate 41 has a first surface 41a and a second surface 41b opposite thereto. The light-refracting microstructure layer 40 consists of a plurality of curved prism units 42 which are raised on the first surface 41a of the substrate 41 and parallel to each other. Conversely, the reinforcing layer 43 covers the second surface 41b of the substrate 41 to form a composite reinforced laminate. Each of the curved prism units 42 has a pair of meandering surfaces 42a, 42b, a pair of common trough lines 421 and a common ridge 422. In comparison with the sixth embodiment, each of the curved prisms 42 of the eighth embodiment substantially has a common horizontal width but varies in vertical heights such that each of the meandering surfaces 42a, 42b of the curved prisms 42 varies in curvature. Preferably, each of the first meandering surface 42a and the second meandering surface 42b consists of a plurality of lateral ridges 423 arranged in staggered manner in a longitudinal direction to provide changes in curvature. In use, the meandering surfaces 42a, 42b serve to refract light penetrated through the substrate 41 in two dimensions for enhancing brightness of light and attenuating morie phenomenon. Additionally, the reinforcing layer 43 can perform a relatively high degree of hardness so that the brightness enhancement film 4 has a high degree of warpage resistance and abrasion resistance.

Figure 1:
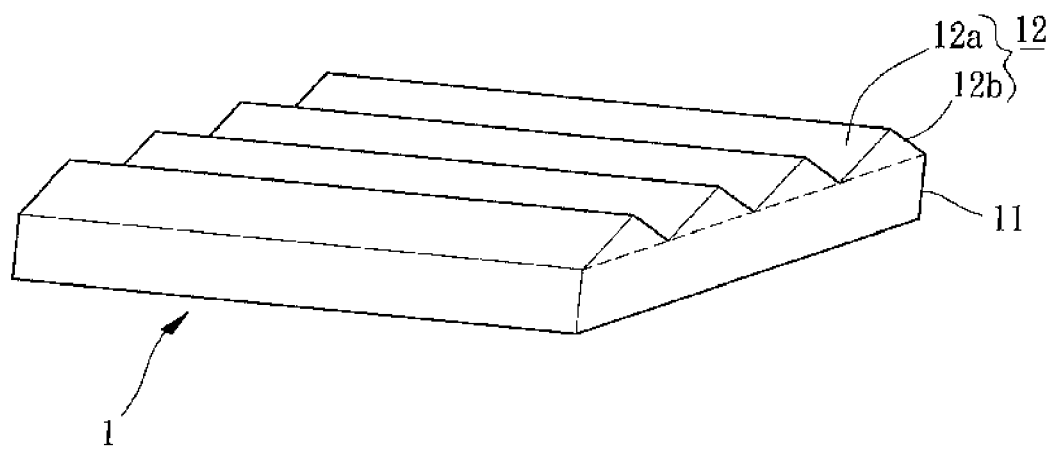
FIG. 1 is a perspective view of a brightness enhancement film in accordance with the prior art.

It will be apparent from the aforementioned discussions that the top surface and the bottom surface disposed on the substrate 11 are unmatched in structure which may cause a specific degree of warpage of the brightness enhancement film 1 in nature, as shown in FIG. 1. However, the substrate 11 provided with the light-refracting microstructure layer 10 and the reinforcing layer 13 on the first surface 11a and the second surface 11b form the brightness enhancement film 1. As a result, the reinforcing layer 13 can perform a relatively high degree of hardness so that the brightness enhancement film 1 has a high degree of warpage resistance and abrasion resistance, as best shown in FIG. 2.

Although the invention has been described in detail with reference to its presently preferred embodiment, it will be understood by one of ordinary skill in the art that various modifications can be made without departing from the spirit and the scope of the invention, as set forth in the appended claims.

What is claimed is:

1. A brightness enhancement film having a reinforcing structure comprising:
    a substrate having a first surface and a second surface, the substrate made from a first transparent material which permits penetrating light through the substrate;
    a light-refracting microstructure layer arranged on the first surface of the substrate, the light-refracting microstructure layer providing changes in curvature so as to refract the light penetrated through the substrate; and
    a reinforcing layer made from a second transparent material, the reinforcing layer covering the second surface of the substrate so as to reinforce the brightness enhancement film;
    wherein the second transparent material of the reinforcing layer has a rate of shrinkage substantially approximate to that of the substrate.

2. The brightness enhancement film having the reinforcing structure as defined in claim 1, wherein the reinforcing layer has a hardness greater than that of the substrate.

3. A brightness enhancement film having a reinforcing structure, comprising:
    a substrate having a first surface and a second surface, the substrate made from a first transparent material which permits penetrating light through the substrate;
    a light-refracting microstructure layer arranged on the first surface of the substrate, the light-refracting microstructure layer providing changes in curvature so as to refract the light penetrated through the substrate; and
    a reinforcing layer made from a second transparent material, the reinforcing layer covering the second surface of the substrate so as to reinforce the brightness enhancement film;
    wherein the first transparent material has a first refractive index and the second transparent material has a second refractive index, the first refractive index being greater than the second refractive index.

4. The brightness enhancement film having the reinforcing structure as defined in claim 3, wherein the second transparent material is selected from a low refractive transparent material relative to that of the first transparent material.

5. The brightness enhancement film having a reinforcing structure as defined in claim 4, wherein the second transparent material is selected from acrylic resin.

6. A brightness enhancement film having a reinforcing structure, comprising:
    a substrate having a first surface and a second surface, the substrate made from a first transparent material which permits penetrating light through the substrate;
    a light-refracting microstructure layer arranged on the first surface of the substrate, the light-refracting microstructure layer providing changes in curvature so as to refract the light penetrated through the substrate; and
    a reinforcing layer made from a second transparent material, the reinforcing layer covering the second surface of the substrate so as to reinforce the brightness enhancement film;
    wherein the reinforcing layer has a thickness ranging between 5 μm and 10 μm.

7. The brightness enhancement film having the reinforcing structure as defined in claim 1, wherein the reinforcing layer covers the second surface of the substrate to form a composite reinforced laminate by coating.

8. A brightness enhancement film having a reinforcing structure, comprising:
    a substrate having a first surface and a second surface, the substrate made from a first transparent material which permits penetrating light through the substrate;
    a light-refracting microstructure layer arranged on the first surface of the substrate, the light-refracting microstructure layer providing changes in curvature so as to refract the light penetrated through the substrate; and
    a reinforcing layer made from a second transparent material, the reinforcing layer covering the second surface of the substrate so as to reinforce the brightness enhancement film;

wherein the reinforcing layer covers the second surface of the substrate to form a composite reinforced laminate by adhesive.

9. A brightness enhancement film having a reinforcing structure, comprising:
a substrate having a first surface and a second surface, the substrate made from a first transparent material which permits penetrating light through the substrate;
a light-refracting microstructure layer arranged on the first surface of the substrate, the light-refracting microstructure layer providing changes in curvature so as to refract the light penetrated through the substrate; and
a reinforcing layer made from a second transparent material, the reinforcing layer covering the second surface of the substrate so as to reinforce the brightness enhancement film;
wherein the reinforcing layer covers the second surface of the substrate to form a composite reinforced laminate by physical vapor deposition or sputtering deposition.

10. The brightness enhancement film having the reinforcing structure as defined in claim 1, wherein the reinforcing layer is deployed on a light incident side of the substrate with respect to a light source.

11. The brightness enhancement film having the reinforcing structure as defined in claim 1, wherein the reinforcing layer is deployed on a light emission side of the substrate with respect to a light source.

12. The brightness enhancement film having the reinforcing structure as defined in claim 1, wherein the light-refracting microstructure layer consists of a plurality of prism units, and each of which consists of a first flat inclined surface and a second flat inclined surface.

13. The brightness enhancement film having the reinforcing structure as defined in claim 1, wherein the light-refracting microstructure layer consists of a plurality of micro-hemispheres.

14. The brightness enhancement film having the reinforcing structure as defined in claim 13, wherein the micro-hemispheres is arranged to form a plurality of hexagonal units in a hexagonal manner such that each of the micro-hemispheres has six of the adjacent micro-hemispheres.

15. The brightness enhancement film having the reinforcing structure as defined in claim 1, wherein the light-refracting microstructure layer consists of a plurality of micro cones.

16. The brightness enhancement film having the reinforcing structure as defined in claim 15, wherein the micro cones are arranged to form a plurality of hexagonal units in a hexagonal manner such that each of the micro cones has six of the adjacent micro cones.

17. The brightness enhancement film having the reinforcing structure as defined in claim 1, wherein the light-refracting microstructure layer consists of a plurality of micro rippled ridges, wherein each of the micro rippled ridges consists of a plurality of micro light-condensing units substantially having a common height, and wherein each of the micro light-condensing units further includes a pair of curved surface, a pair of common trough line and a common ridge line.

18. The brightness enhancement film having the reinforcing structure as defined in claim 17, wherein the trough line of the micro light-condensing unit is substantially constructed from a straight line.

19. The brightness enhancement film having the reinforcing structure as defined in claim 17, wherein the trough line of the micro light-condensing unit is being substantially constructed from a curved line.

20. The brightness enhancement film having the reinforcing structure as defined in claim 17, wherein the common ridgeline of the micro light-condensing unit is substantially constructed from a curved line.

21. The brightness enhancement film having the reinforcing structure as defined in claim 1, wherein the light-refracting microstructure layer consists of a plurality of prism units, and wherein each of which includes a pair of meandering surfaces, a pair of common trough line and a common ridge.

22. The brightness enhancement film having the reinforcing structure as defined in claim 21, wherein each of the curved prisms substantially has a common vertical height and a common horizontal width such that each of the meandering surfaces of the curved prisms substantially has the same changes in curvature.

23. The brightness enhancement film having the reinforcing structure as defined in claim 21, wherein each of the curved prisms substantially has a common vertical height but varying in horizontal widths such that each of the meandering surfaces of the curved prisms varies in curvature.

24. The brightness enhancement film having the reinforcing structure as defined in claim 21, wherein each of the curved prisms substantially has a common horizontal width but varying in vertical heights such that each of the meandering surfaces of the curved prisms varies in curvature.

25. The brightness enhancement film having the reinforcing structure as defined in claim 21, wherein at least one of the meandering surfaces consists of a plurality of lateral ridges arranged in staggered manner in a longitudinal direction to provide changes in curvature.

26. The brightness enhancement film having the reinforcing structure as defined in claim 1, wherein the light-refracting microstructure layer is integrally formed on the first surface of the substrate.

27. The brightness enhancement film having the reinforcing structure as defined in claim 1, wherein the light-refracting microstructure layer and the substrate are separately made from different transparent materials and adhered to each other.

28. The brightness enhancement film having the reinforcing structure as defined in claim 1, wherein the first transparent material is selected from an epoxy or UV curable adhesive.

* * * * *